United States Patent [19]

Tan et al.

[11] Patent Number: 5,551,000
[45] Date of Patent: Aug. 27, 1996

[54] I/O CACHE WITH DUAL TAG ARRAYS

[75] Inventors: Juay K. Tan, San Jose; Robert W. Kwong, Los Altos, both of Calif.

[73] Assignee: Sun Microsystems, Inc., Mountain View, Calif.

[21] Appl. No.: 33,502

[22] Filed: Mar. 18, 1993

[51] Int. Cl.⁶ .............................. G06F 12/00; G06F 13/00
[52] U.S. Cl. .................... 395/445; 395/403; 395/414; 395/421.03; 364/DIG. 1; 364/DIG. 2; 364/243.4; 364/243.41
[58] Field of Search ..................... 395/400, 425, 395/700, 403, 405, 445, 456, 472, 414, 416, 418, 419, 421.03

[56] References Cited

U.S. PATENT DOCUMENTS

| | | | |
|---|---|---|---|
| 4,075,686 | 2/1978 | Calle et al. | 395/425 |
| 4,853,846 | 8/1989 | Johnson et al. | 395/425 |
| 5,247,648 | 9/1993 | Watkins et al. | 395/425 |
| 5,247,653 | 9/1993 | Hung | 395/456 |
| 5,263,142 | 11/1993 | Watkins et al. | 395/425 |
| 5,287,482 | 2/1994 | Arimilli et al. | 395/425 |
| 5,293,622 | 3/1994 | Nicholson et al. | 395/425 |
| 5,319,766 | 6/1994 | Thaller et al. | 395/472 |
| 5,353,426 | 10/1994 | Patel et al. | 395/445 |
| 5,410,669 | 4/1995 | Biggs et al. | 395/445 |
| 5,418,927 | 5/1995 | Chang et al. | 345/425 |

*Primary Examiner*—Tod R. Swann
*Assistant Examiner*—Tuan V. Thai
*Attorney, Agent, or Firm*—Blakely Sokoloff Taylor & Zafman

[57] ABSTRACT

An I/O streaming cache is provided to improve the data transfer bandwidth of an I/O bus of a computer system. The I/O streaming cache comprises at least one data array, a parent tag array, at least one child tag array, and control circuitry. The data arrays comprise a number of cache lines, each cache line having at least two cache line segments, for storing data being retrieved/prefetched during read operations and data being written during write operations. The parent tag array comprises a number of parent tag entries, one parent tag entry for each cache line, for describing a memory page being mapped by the corresponding cache line. The child tag arrays comprise a number of child tag entries, one child tag entry for each cache line segment, for describing the data blocks stored in the corresponding cache line segments. Each parent tag entry is parent to the child tag entries of the cache line segments of its corresponding cache line. The control circuitry controls responses to the data reading and writing operations against the memory by the I/O devices using the data arrays, and the parent and child cache tag arrays.

22 Claims, 7 Drawing Sheets

PARENT TAG i

| PAGE ADDRESS | READ/WRITE | PAGE SIZE | /31* |

*Figure 4a*

CHILD TAG j

| DATA BLOCK ADDRESS | OFFSET | BYTE COUNT | VFLAG | /33* |

I/O CACHE WITH DUAL TAG ARRAYS

BACKGROUND OF THE INVENTION

1. Field of the Invention

The present invention relates to the field of computer systems, in particular, data transfers between the memory and the input/output (I/O) devices of multiprocessor systems. More specifically, the present invention relates to data transfers where each transfer involves a large amount of sequential data.

2. Background

Traditionally, data transfers between memory and an input-output (I/O) device of a computer system are accomplished in one of three ways:

1. Programmed I/O. In this case, all data transfers between the memory and the I/O device is completely controlled by the central processing unit (CPU), or more precisely, by a program executed by the CPU.
2. Interrupt I/O. In this case, all data transfers between the memory and the I/O device are initiated by the I/O devices through interrupts. In response, the CPU suspends whatever it is currently doing and attends to the needs of the interrupting I/O device.
3. Direct Memory Access (DMA). In this case, all data transfers between the memory and the I/O devices are accomplished without involving the CPU.

The DMA approach provides a much faster way of moving data between the memory and the I/O devices. Typically, a DMA controller is employed. Upon request of an I/O device, the DMA controller competes with the CPU through an arbiter for control of the system bus. Upon gaining control of the system bus, the DMA controller causes data to be transferred between the memory and the requesting I/O device. The DMA controller may or may not be involved in the actual transfer of the data. If the DMA controller is involved with actual data transfer, data are normally transferred on a first-in first-out (FIFO) basis. In other words, the memory (I/O device) waits while the data are being retransmitted from the DMA controller to the I/O device (memory). Although some DMA controllers allow the next data transfer from the memory (I/O device) to parallel the re-transmission of the prior data to the I/O device (memory), the next data must be sequential to the prior data. To support simultaneous data transfers by multiple I/O devices, the logic is replicated within the DMA controller.

Although, from the perspective of system performance, it is desirable to cache the I/O data being transferred between the memory and the I/O devices, because of the complexity of maintaining data coherency, unlike data transfers between the memory and the CPU where the data are typically cached, I/O data are typically not cached. Only a write through central cache or a write back central cache coupled with some kind of basic cache coherency mechanism is employed to ensure the cached data does not become stale.

In U.S. patent application Ser. Nos. 07/508,979, and 07/508,939, both filed on Apr. 12, 1990, assigned to the assignee of the present invention, both now abandoned, an I/O cache and a complimentary combined hardware and software cache coherency mechanism is disclosed. A continuation application filed on the former abandoned application issued as U.S. Pat. No. 5,263,142 on Nov. 16, 1993, while a continuation application filed on the latter abandoned application issued as U.S. Pat. No. 5,247,648 on Sep. 21, 1993. Under this disclosed I/O cache and complimentary cache coherency mechanism, I/O devices are classified into at least three (3) classes. For class 1 devices, the operating system dynamically allocates unique sets of memory pages for these I/O devices. The I/O cache maps these unique sets of memory pages to corresponding unique sets of I/O cache lines, one I/O cache line per memory page. For Class 2 devices, the operating system statically allocates unique sets of memory pages for these I/O devices. The I/O cache maps these unique sets of memory pages to corresponding unique sets of I/O cache lines having predetermined number of I/O cache lines. For class 3 devices, the operating systems marks the allocated memory pages as non-cacheable, thereby bypassing the I/O cache.

As the technology of multiprocessor systems continues to improve, more and more I/O devices as well as processors having their own private caches are being incorporated into a single multiprocessor system. Due to the inherent latency for fetching data from the memory, as requested by an I/O device, and maintaining coherency in the various I/O private caches, the I/O buses coupling the I/O devices to the I/O cache tend to operate below their maximum data transfer bandwidth potentials. The ability to operate closer to the maximum data transfer bandwidth potential is especially desirable for the slower I/O buses, in particular, when transferring streams of massive amounts of sequential data.

In U.S. patent application Ser. No. 07/778,507, filed on Oct. 17, 1991, assigned to the assignee of the present invention, and issued as U.S. Pat. No. 5,283,883 on Feb. 1, 1994, a DMA controller with improved throughput is disclosed. The disclosed DMA controller comprises a buffer control circuit, two buffers, two corresponding buffer tags, two corresponding groups of valid/dirty bits, an I/O device interface and a system bus interface. The I/O device interface receives the read and write operations from the I/O device, whereas, the system bus interface retrieves and writes data bytes from and into the memory. During read operations, the two buffers store the retrieved data, including pre-fetched data. During write operations, the two buffers store the data to be written into the memory. The two corresponding buffer tags identify the memory addresses associated with the data bytes stored in the two buffers. The two groups of valid/dirty bits identify whether the data bytes stored in the two buffers are valid/dirty. The buffer control circuit controls the data reading and data writing operations. During read operations, the buffer control circuit determines whether data bytes being read are validly stored in one of the buffers or whether they need to be retrieved from the memory. It also determines whether data bytes are to be pre-fetched, and where the retrieved/pre-fetched data bytes are to be stored. During write operations, the buffer control circuit determines where the data bytes being written are to be stored, and when the dirty data bytes are to be drained into the memory. As a result of the improved throughput, a higher data transfer bandwidth rate is sustained on the I/O bus. However, similar to the traditional DMA controllers, to support simultaneous data transfers by multiple I/O devices, the buffers, buffer tags etc. have to be replicated within the DMA controller for each I/O device supported.

As will be disclosed, the present invention provides an I/O streaming cache for caching I/O data that further improves the I/O data transfer rate between the memory and the I/O devices, particularly when transferring streams of massive amounts of sequential data, without requiring a large amount of duplicated hardware resources. As will be obvious from the descriptions to follow, the present invention can be applied to multiprocessor systems, in particular, microprocessor based multiprocessor systems.

SUMMARY OF THE INVENTION

Under the present invention, the higher data transfer bandwidth is advantageously achieved for an I/O bus in a multiprocessor system by providing an I/O streaming cache to the system. The I/O streaming cache comprises at least one data array, a parent tag array, at least one child tag array, and control circuitry. The data arrays comprise a number of cache lines, each cache line having at least two cache line segments. The parent tag array comprises a number of parent tag entries, one parent tag entry for each cache line. Each parent tag entry comprises a memory page address, and a memory page access mode indicator of the corresponding cache line. The child tag arrays comprise a number of child tag entries, one child tag entry for each cache line segment. Each child tag entry comprises a data block address, an offset, a byte count, and a data validity indicator of the corresponding cache line segment. Each parent tag entry is parent to the child tag entries of the cache line segments in its corresponding cache line.

During read from memory operations, the I/O cache line segments store the retrieved data, including pre-fetched data. During write operations, the I/O cache line segments store the data to be written into the memory. The parent tag entries, in conjunction with the corresponding child tag entries, identify the memory addresses associated with the data blocks stored in the cache line segments of the various cache lines. The validity indicators identify whether the data blocks stored in the cache line segments are valid and dirty. The control circuitry controls responses to the data reading and data writing operations to the memory by the I/O devices. During read operations, the control circuitry determines whether the requested data blocks read are validly stored in one of the cache line segments or whether they need to be retrieved from the memory. It also determines whether data blocks are to be pre-fetched, and where the retrieved/pre-fetched data blocks are to be stored. During write operations, the control circuitry determines where the data blocks being written are to be stored, and when the dirty data bytes are to be drained into the memory.

BRIEF DESCRIPTION OF THE DRAWINGS

The objects, features, and advantages of the present invention will be apparent from the following detailed description of the presently preferred and alternate embodiments of the invention with references to the drawings in which.

DETAILED DESCRIPTION

Presently Preferred and Alternate Embodiments

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
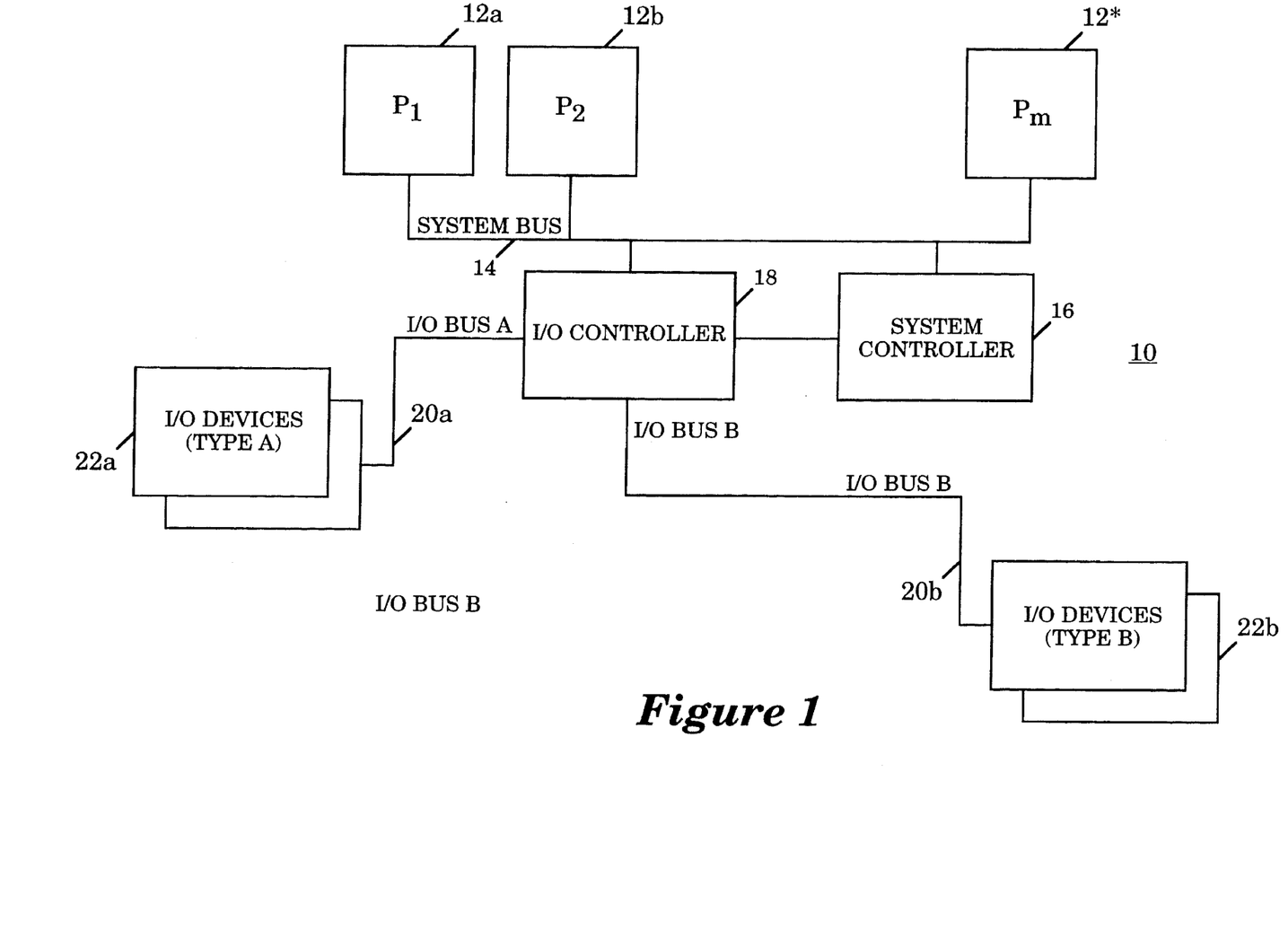
FIG. 1 shows an exemplary multiprocessor system incorporated with the teachings of the present invention.

Referring now to FIG. 1, a block diagram illustrating a multiprocessor system incorporated with the teachings of the present invention is shown. The multiprocessor system 10 comprises a number of processors 12*, each having its own private cache, coupled to a system bus 14. The multiprocessor system 10 further comprises a memory (not shown), a system controller 16 and an I/O controller 18 incorporated with the teachings of the present invention. The two controllers 16 and 18 are coupled to each other and to the system bus 14. The I/O controller 18 is also coupled to a number of I/O buses 20* having different operating speeds. The I/O devices 22* are coupled to the I/O buses 20* accordingly. The I/O controller 18 will be described in further detail below with additional references to the remaining figures. The processors 12*, the system bus 14, the system controller 16, the I/O buses 20*, and the I/O devices 22*, are intended to represent a broad category of these elements found in most computer systems. The constitution and functions of these elements are well known, and will not be further described. Additionally, while the present invention is being described with the exemplary multiprocessor system having a number of private caches and I/O buses, based on the descriptions to follow, it will be appreciated that the present invention may be practiced in either multiprocessor or uniprocessor systems, having zero or more central caches and one or more I/O buses.

Figure 2:
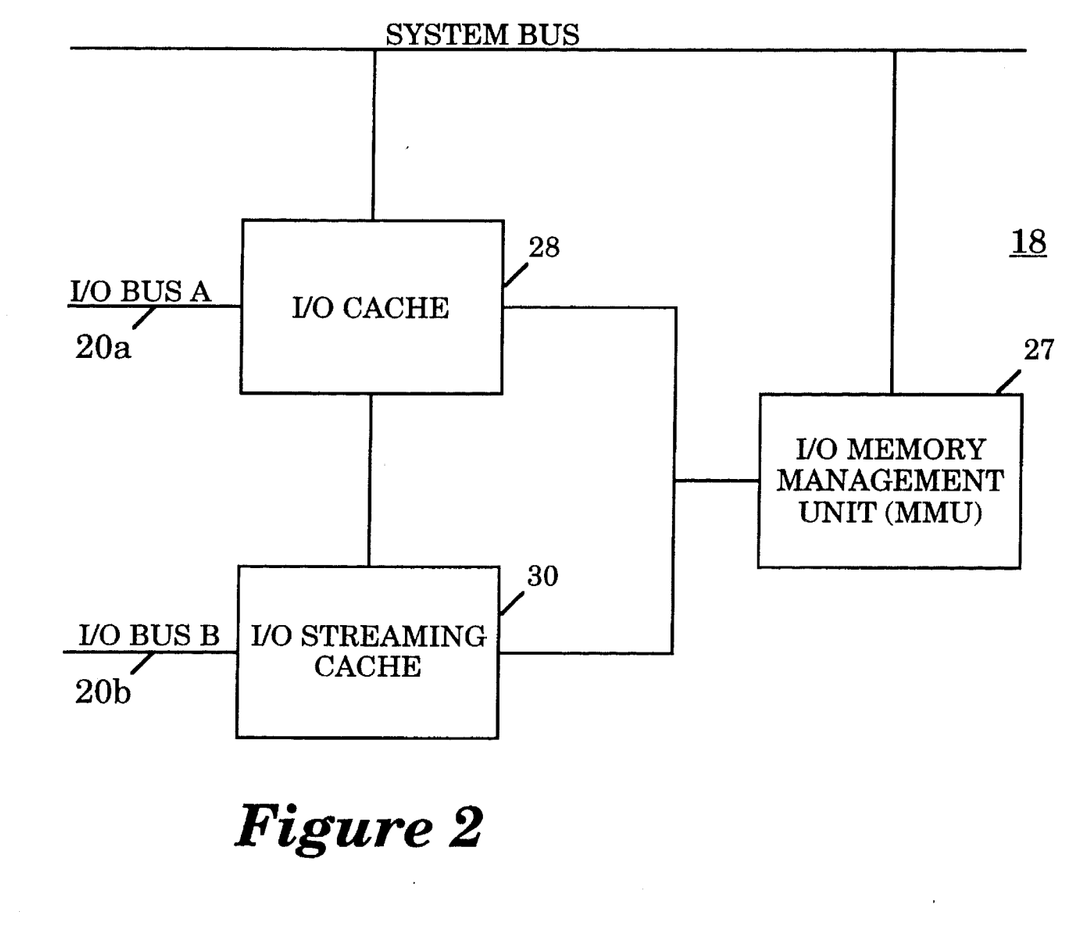
FIG. 2 illustrates the I/O controller of FIG. 1 in further detail.

Referring now to FIG. 2, a block diagram illustrating the I/O controller of FIG. 1 in further detail. The I/O controller 18 comprises an I/O memory management unit (IOMMU) 27, an I/O cache 28, and the I/O streaming cache 30 of the present invention. The two caches 28 and 30 are coupled to each other, and to the IOMMU 27. Additionally, the I/O cache 28 is coupled to the system bus, and the higher speed I/O bus 20a, while the I/O streaming cache 30 is coupled to the slower speed I/O bus 20b. The IOMMU 27 is also coupled to the system bus. The I/O streaming cache 30 will be described in further detail below. The IOMMU 27 is intended to represent a broad category of memory management units found in most computer systems. Its constitution and functions are well known and will not be further described. The I/O cache 28 may be implemented in a variety of manners including but not limited to the I/O cache described in U.S. patent applications Ser. Nos. 07/508,979 and 07/508,939, both no abandoned and followed by continuation applications which issued as U.S. Pat. Nos. 5,263,142 and 5,247,648, respectively. Furthermore, while the present invention is being described with the exemplary multiprocessor system having an I/O cache, based on the descriptions to follow, it will be appreciated that the present invention may be practiced in systems with or without I/O caches.

Figure 3A:
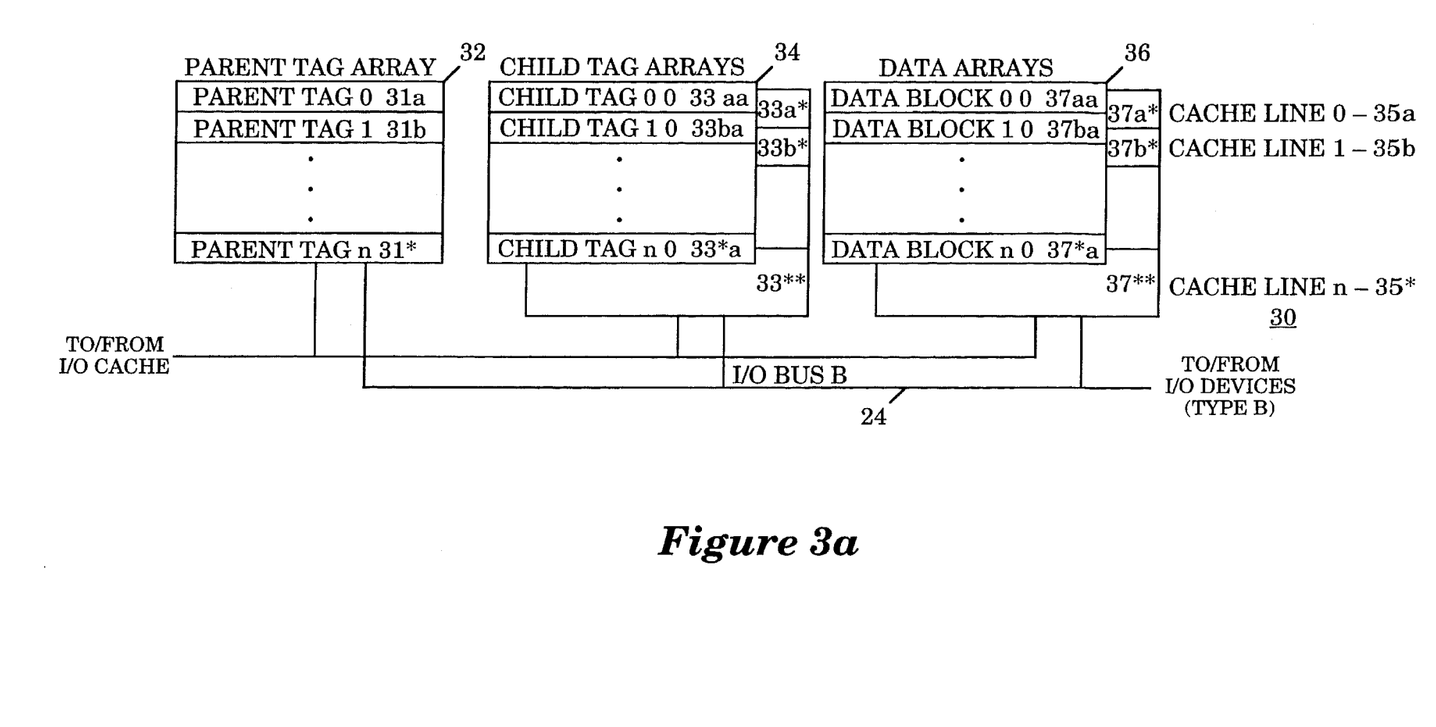
FIGS. 3a–3b illustrate the I/O streaming cache of the present invention in further detail.
Figure 3B:
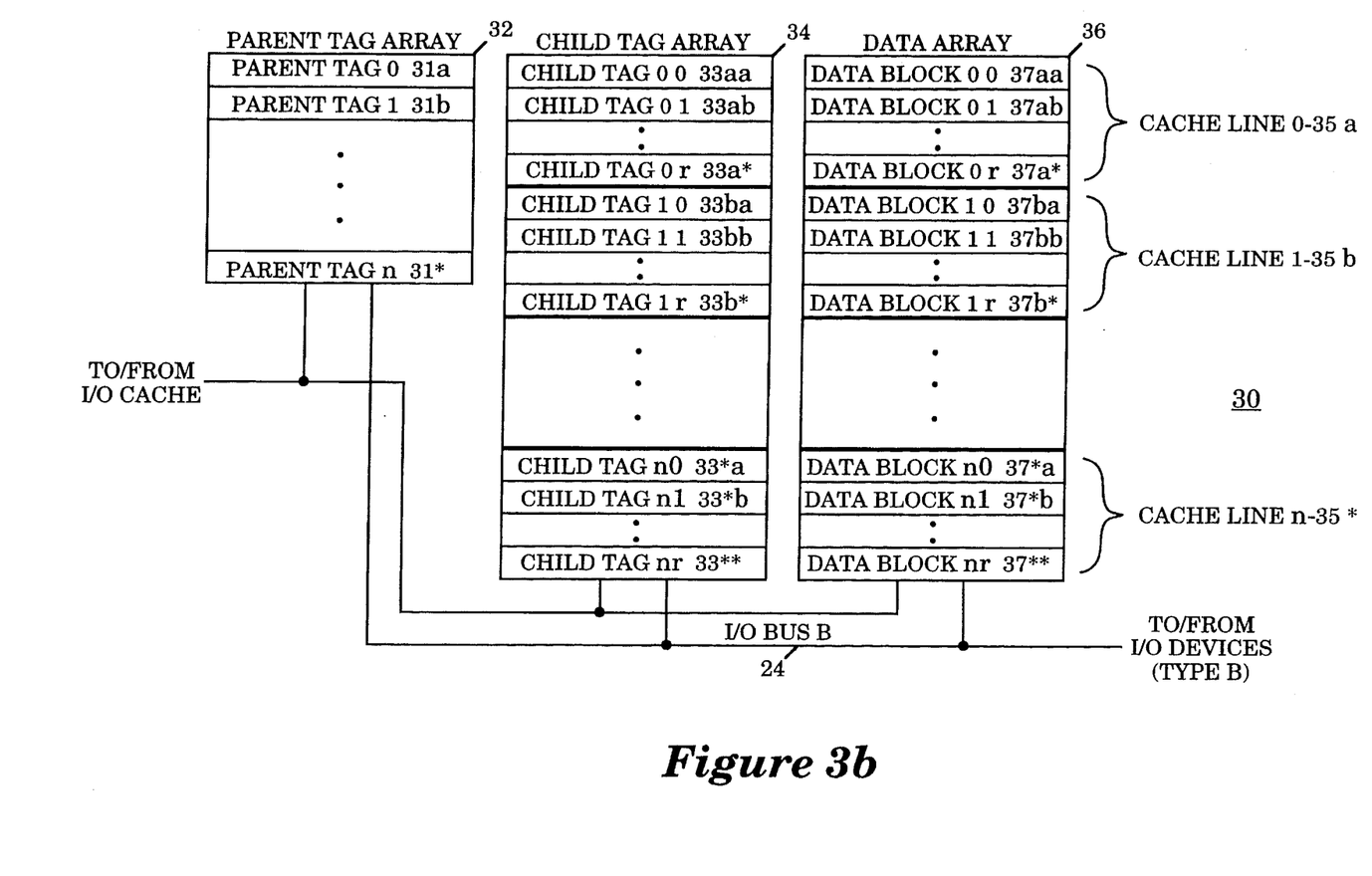

Referring now to FIGS. 3a–3b, two block diagrams illustrating the I/O streaming cache of the present invention in further detail are shown. The I/O streaming cache 30 comprises at least one cache data array 36, a parent tag array 32, at least one child tag array 34, and control circuitry (not shown). The cache data arrays 36 comprise a number of cache lines, 35*, each cache line having at least two cache line segments 37*, for storing data being retrieved and prefetched from the memory during read operations, and data being written into the memory during write operations. Each cache line 35* is mapped to a memory page of the memory in one of the various well known cache mapping manners. Additionally, the cache lines and the cache line segments are allocated in one of various well known replacement manners. The parent tag array 32 comprises a number of parent tag entries 31*, one parent tag entry for each cache line 35*, for describing one of the cache lines 35*. The child tag arrays 34 comprise a number of child tag entries 33*, one child tag entry 33* for each cache line segment 37*, for describing one of the cache line segments 37*. Each parent tag entry 31* is parent to the child tag entries 33* of the cache line segments 37* of its corresponding cache line 35*. The control circuitry comprises control logic for controlling accesses to these arrays 32–36 during read and write operations.

In one embodiment, the I/O streaming cache 30 comprises one data array 36, the parent tag array 32, one child tag array 34, and the control circuitry. The data array 36 comprises sixteen (16) cache lines 35*, each cache line 35* having two (2) sixty-four (64) byte cache line segments 37*. The cache lines 35* are mapped to the memory pages of the memory in a fully associative manner, one cache line 35* per memory page. The cache lines 35* are allocated using a least recently used (LRU) replacement scheme, while the cache line segments 37* within a cache line are allocated in a "ping-pong" manner. The parent tag array 32 comprises sixteen (16) parent tag entries 31*, one parent tag entry 31* for each one of the 16 cache lines 35*. The child tag array 34 comprises thirty two (32) child tag entries 33*, one child tag entry 33* for each one of the 32 64-byte cache line segments 37*. Since each cache line 35* has two cache line segments 37*, each parent tag entry 31* is parent to two child tag entries 33*.

Figure 4A:
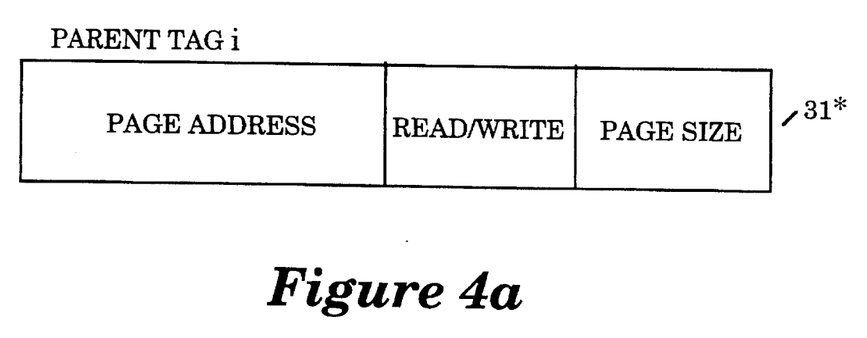
FIGS. 4a–4b illustrate the parent and child cache tags of the I/O streaming cache of the present invention in further detail.
Figure 4B:
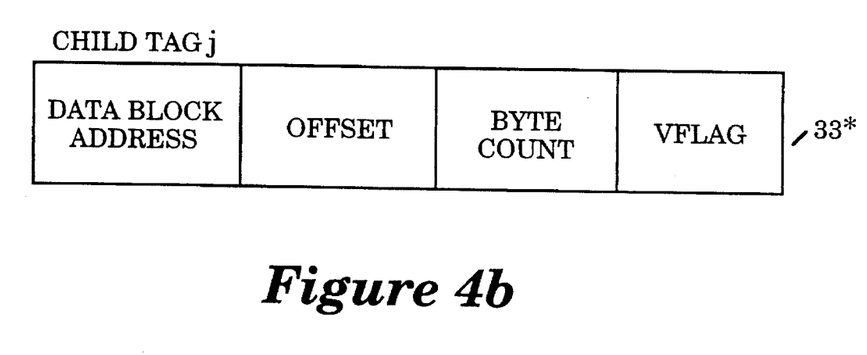

Referring now to FIGS. 4a–4b, two block diagrams illustrating the parent and child tag entries of the present invention in further detail is shown. As illustrated in FIG. 4a, each parent tag entry 31* comprises a memory page address identifying the current memory page which the data in the corresponding cache line are stored in, and a memory page access mode indicator indicating whether data are being retrieved/prefetched from or written into the mapped memory page. Preferably, each parent tag entry 31* further comprises a page size indicator indicating the memory page size, thereby allowing different memory page sizes to be supported. As illustrated in FIG. 4b, each child tag entry 33* comprises a data block address for identifying the data block of the mapped memory page currently being stored in the corresponding cache line segment, and a validity indicator indicating whether the data currently stored in the corresponding cache line are valid or not. Each child tag entry 33* further comprises an offset indicator indicating the offset into the cache line segment for the starting byte, and a byte count for the number of bytes currently stored in the corresponding cache line segment.

Figure 5:
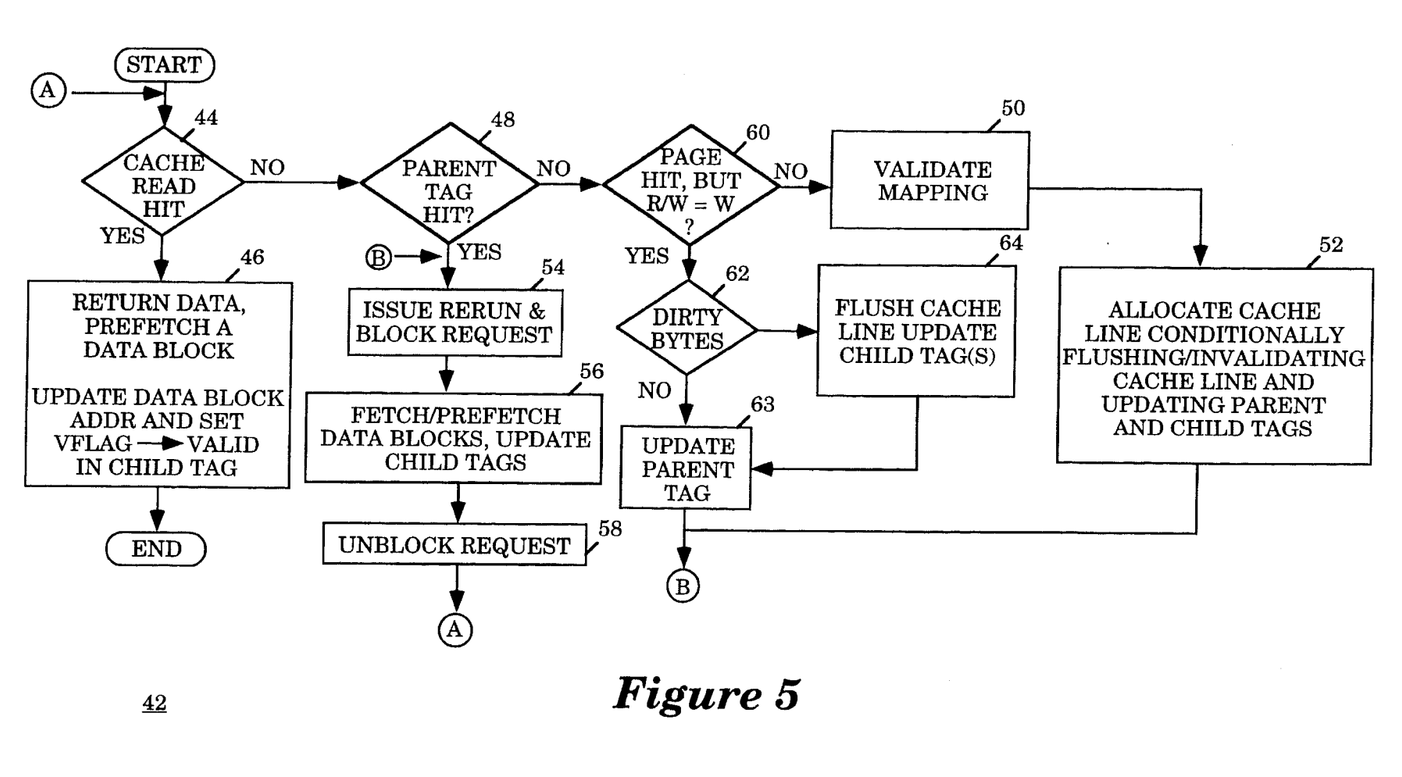
FIG. 5 illustrate the method for reading data in memory by I/O devices using the I/O streaming cache of the present invention.

Referring now to FIG. 5, a block diagram illustrating the method for reading data in the memory by I/O devices using the I/O streaming cache of the present invention is shown. As illustrated, during a read operation, initially, the control circuitry of the I/O streaming cache determines whether there is a cache read hit, step 44. A cache read hit exists if there is an address match with the memory page address of a parent tag entry, the memory page access mode of the address matched parent tag entry is "read", there is an address match with one of data block addresses of the child tag entries belonging to the address and access mode matched parent tag entry, and the validity indicator of the addressed matched child tag entry indicates the data stored are valid.

If there is a cache read hit, the data block stored in the cache line segment yielding the cache read hit is returned to the I/O device immediately, a data block having a predetermined relationship to the data block being returned is pre-fetched and stored in one of the cache line segments of the cache line hit, the data block address and the validity indicator of the corresponding child tag entry are updated accordingly, step 46. In one embodiment, the prefetched data block is the second data block sequential to the data block currently being read. The first data block sequential to the data block currently being read was prefetched when the predecessor data block of the data block currently being read was read.

If the current read access results in a cache read miss, the control circuitry further determines if there is at least a parent tag hit, using the results of address and access mode matching against the parent tag entries, step 48. If there is a parent tag hit, the control circuitry issues a rerun request and a blocking request to the I/O bus, causing the read request to be retried but temporarily blocked, step 54. Upon issuing the rerun and blocking requests, the control circuitry causes the data block being read and a predetermined number of data blocks having a predetermined relationship to the data block currently being accessed to be fetched/prefetched from the memory, and stored into the cache line segments of the allocated cache line, and the corresponding child tag entry to be updated with the appropriate addresses and validity indicator, step 56. The control circuitry then issues an unblock request to the I/O bus, releasing the blocked read request, step 58. As a result, the read request will be reattempted resulting in a cache read hit, the return of the data block being read to the reading I/O device, and the prefetch of another data block, steps 44–46. In one embodiment, one data block is prefetched, and the prefetched data block is the first data block sequential to the data block currently being read and fetched. Additionally, while the present invention is being described with control circuitry using a rerun, a block and an unblock request to temporarily suspend and subsequently resume execution of the request, it will be appreciated that the present invention may be practiced with other equivalent manners of suspending and resuming execution of the request.

If the current read access results in a cache read miss with no parent tag hit, the control circuitry further determines whether there is at least a page hit but the access mode of the memory page hit is "write", using the results of tag matching against the parent tag entries, step 60. If there is a memory page hit but the memory page was being written into, the control circuitry further determines whether there are undrained dirty bytes in the cache line segments of the cache line currently mapping the memory page hit, step 62. If there are undrained dirty bytes in the cache line segments of the cache line hit, the control circuitry causes the dirty bytes to be drained and the corresponding child tag entries to be updated, step 64. Upon determining there are no undrained dirty bytes or flushing the undrained dirty bytes, the control circuitry then updates the access mode of the parent tag entry, and causes steps 54–58, in turn steps 44–46, to be performed as described earlier.

If the current read access results in a cache read miss with no parent tag hit, and not even a page hit, the control circuitry then validates the page mapping, step 50. The control circuitry checks with the IOMMU to ensure the memory page is mapped. If the memory page is not mapped, the control circuitry requests the IOMMU to have the memory page mapped. Upon validating the mapping, the control circuitry then causes a cache line to be allocated, and the corresponding parent tag entry is updated accordingly, step 52. Allocation of one of the cache line may involve flushing or invalidating the content of the cache line being allocated, depending on the access mode of the memory page mapped and whether any data stored in the cache line segments are valid or not. Flushing or invalidating the content of a cache line will be described in further detail below.

Figure 6:
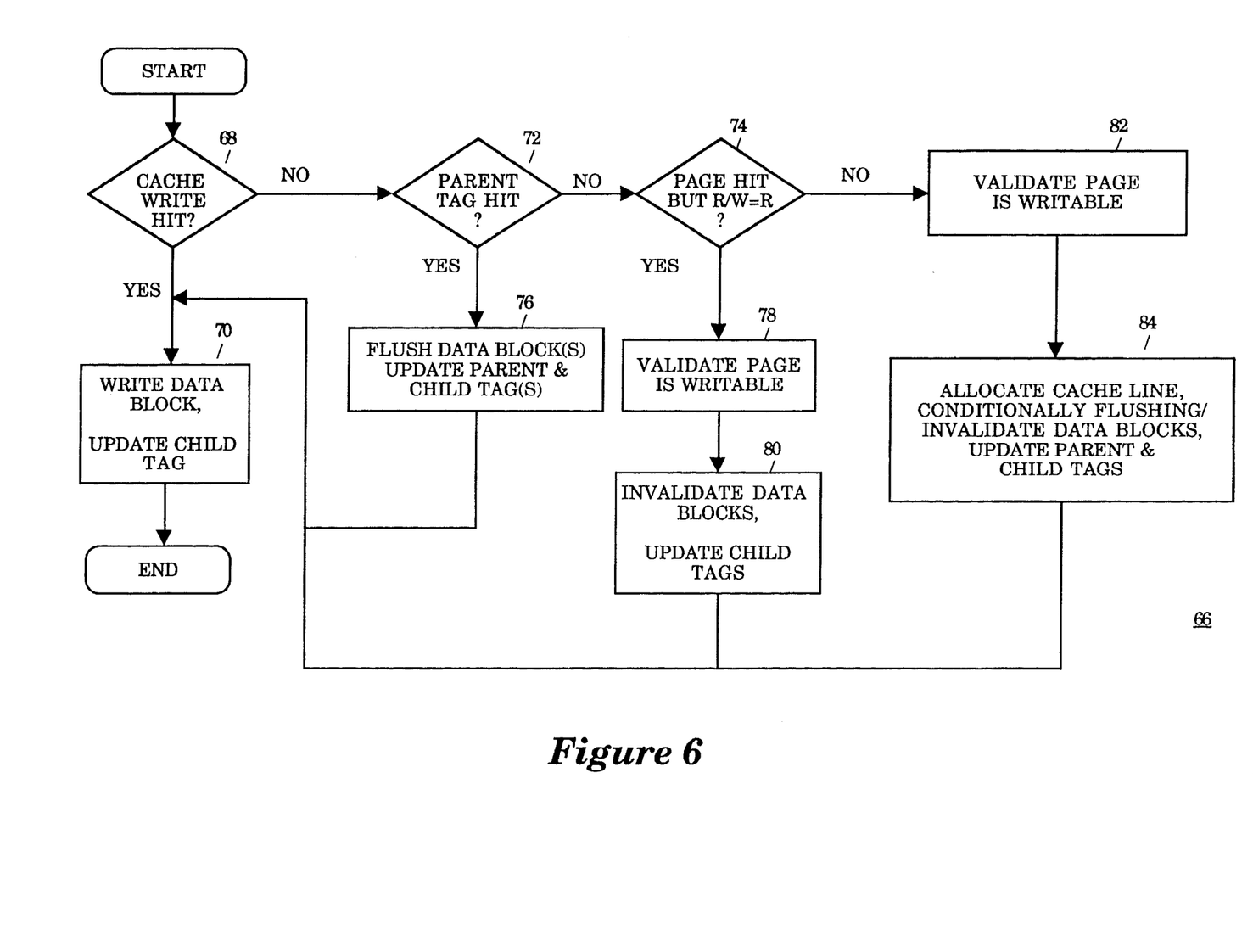
FIG. 6 illustrate the method for writing data into memory by I/O devices using the I/O streaming cache of the present invention.

Referring now to FIG. 6, a block diagram illustrating the method for writing data into the memory by I/O devices using the I/O streaming cache of the present invention is shown. As illustrated, during a write operation, initially, the control circuitry of the I/O streaming cache determines whether there is a cache write hit, step 68. Similarly, a cache write hit exists if there is an address match with the memory page address of a parent tag entry, the memory page access mode of the address matched parent tag entry is "write", there is an address match with one of data block addresses of the child tag entries of the address and access mode matched parent tag entry, the validity indicator of the addressed matched child tag entry indicates the data stored are valid, and there is a next location match based on the offset and byte count of the addressed matched child tag entry.

If there is a cache write hit, the data are written into the appropriate locations of the cache line segment yielding the cache write hit, step 70. Additionally, the offset and byte count of the corresponding child tag entry are updated accordingly as appropriate, step 70.

If the current write access results in a cache write miss, the control circuitry further determines if there is at least a parent tag hit, using the results of address and access mode matching against the parent tag entries, step 72. If there is a parent tag hit, the control circuit causes the cache line mapping the memory page hit to be flushed, draining any dirty bytes in the cache lines segments, step 76. Then, one of the cache line segment is selected, and the data are written into the appropriate locations of the selected cache line segment, step 70. Additionally, the offset and the byte count of the corresponding child tag entry are updated accordingly, step 70.

If the current write access results in a cache write miss with no parent tag hit, the control circuitry further determines if there is a page hit but the access mode of the memory page hit is "read", step 74. If there is a page hit but the memory page hit was being read, the control circuitry validates with the IOMMU that the page is writable, step 78. A memory page may be denoted writable or read only based on any one of a variety of well known manners. If the page is not writable, the control circuitry causes an exception condition to be raised and the write request aborted. On the other hand, upon validating that the memory page is writable, the control circuitry causes the access mode of the parent tag entry and the VFLAGs of the child tag entries to be updated, invalidating the data, step 80, before causing step 70 to be performed as described earlier.

If the current write access results in a cache write miss with no parent tag hit, not even a page hit, the control circuitry validates with the IOMMU that the page is writable as described earlier, step 82. Upon validating the page hit is writable, the control circuitry then allocates one of the cache lines, conditionally flushing any dirty data or invalidating any valid data in the cache line segments of the cache line being allocated if necessary, and updating the corresponding parent and child tag entries accordingly, step 84, before causing step 70 to be performed as described earlier.

Referring now to FIGS. 5 and 6, as described earlier, under various conditions, e.g. steps 64, 80, and 84, the dirty or valid data in the cache line segments of a cache line have to be flushed or invalidated. Flushing or invalidation may be implemented in a any one of a variety of well known manners, including but not limited to the use of a flushing/invalidation address register is used. Under the flushing/invalidation address register approach, flushing or invalidation is triggered by writing a memory page address into the flushing/invalidation address register. If the memory page address in a parent tag entry matches the memory page address in the flushing/invalidation address register, and the access mode in the parent tag entry is "write", the dirty bytes stored in the cache line segments of the corresponding cache line will be drained. On the other hand, if the memory page address in a parent tag entry matches the memory page address in the flushing/invalidation address register, and the access mode in the parent tag entry is "read", the valid data in the cache line segments of the corresponding cache line will be invalidated.

Additionally, it will be appreciated that the method steps illustrated in FIGS. 5 and 6 for reading and writing I/O data using the I/O streaming cache of the present invention may be used by an I/O device having multiple I/O ports to concurrently access multiple streams of data in the memory.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system comprising a memory, an input/output (I/O) bus coupled to said memory, and a plurality of I/O devices coupled to said I/O bus, a streaming cache for caching data being transferred between said memory and said I/O devices during read and write operations, said streaming cache comprising:

a) cache data array means comprising at least one cache data array having a plurality of cache lines, wherein each cache line having at least two cache line segments, for caching said data being transferred between said memory and said I/O devices during read and write operations including data prefetched from said memory in anticipation of being transferred to said I/O devices during read operations, each cache line segment including a plurality of data bytes, each of said cache lines being mapped to a memory page;

b) first cache tag array means comprising a parent cache tag array having a plurality of parent cache tag entries identifying said cache lines, one parent cache tag entry per cache line, for describing data cached in said cache lines, each of said parent cache tag entries describing common attributes of data cached in the cache line segments of the identified cache line;

c) second cache tag array means comprising at least one child cache tag array having a plurality of child cache tag entries used to identify said cache line segments, one child cache tag entry per cache line segment, for describing data cached in said cache line segments, each of said child cache tag entry describing unique attributes of data cached in its corresponding cache line segment;

d) control means coupled to said I/O bus, said cache data array means, said first and second cache tag array means for responding to read and write operations from and to said memory by said I/O devices using said at least one cache data array, and said parent and child cache tag arrays.

2. The streaming cache as set forth in claim 1, wherein, each of said parent cache tag entries comprises a memory page address identifying a memory page to which the corresponding cache line is mapped, and an access mode indicator indicating whether the memory page is being read or written into by an I/O device.

3. The streaming cache as set forth in claim 2, wherein, each of said parent cache tag entries further comprises a memory page size indicator.

4. The streaming cache as set forth in claim 2, wherein, each of said child cache tag entries comprises a memory block address identifying a memory block of the memory page whose data are currently cached in the corresponding cache line segment, an offset indicator identifying a starting byte location in the corresponding cache line segment where data are cached, a byte count denoting the number of data bytes currently cached in the corresponding cache line segment, and a validity indicator identifying whether data currently cached in the corresponding cache line segment during read operations are valid and whether data currently cached in the corresponding cache line segment during write operations are dirty.

5. The streaming cache as set forth in claim 1, wherein, when a read from said memory by an I/O device results in a cache read hit, said control means' response to the read from memory includes causing a new data block to be prefetched from said memory and stored into one of the cache line segments of the cache line yielding the cache read hit, the new data block having a predetermined relationship to the data being read by the I/O device.

6. The streaming cache as set forth in claim 5, wherein, the prefetched data block is a second sequential data block to the data being read by the I/O device, a first sequential data block to the data being read by the I/O device having been prefetched when a predecessor data block to the data being read by the I/O device was read by the I/O device.

7. The streaming cache as set forth in claim 1, wherein, when a read operation against said memory by an I/O device results in a cache read miss, said control means' response to the read operation includes causing a rerun and a blocking request to be issued to said I/O bus, the data being read by the I/O device and a predetermined number of new data blocks having a predetermined relationship to the data being read by the I/O device to be fetched and prefetched from said memory and stored into selected number of cache line segments of a selected cache line, and then an unblocking request to be issued to said I/O bus, said control means' response to the read operation further includes selectively causing mapping validation of said memory, allocation of one of said cache lines, and flushing a cache line, depending on the content of said parent and child cache tag arrays, said allocation of one of said cache lines including conditional flushing/invalidating of the content of the cache line to be allocated depending on the content's state.

8. The streaming cache as set forth in claim 7, wherein, the predetermined number of new data blocks to be prefetched equals the number of cache line segments of the selected cache line minus one.

9. The streaming cache as set forth in claim 1, wherein, said control means' response to a write operation includes causing the data being written into said memory to be written into a cache line segment of a cache line yielding a cache write hit, and the corresponding child cache tag entry to be updated.

10. The streaming cache as set forth in claim 9, wherein, when a write operation against said memory by an I/O device results in a cache write miss, said control means' response to the write operation further includes selectively causing memory page writability validation, allocation of one of said cache lines, flushing/invalidating a cache line, depending on the content of said parent and child cache tag arrays, said allocation of one of said cache lines including conditional flushing/invalidating of the cache line to be allocated depending on the content's state.

11. In a computer system comprising a memory, an input/output (I/O) bus coupled to said memory, and a plurality of I/O devices coupled to said I/O bus, a method for caching data being transferred between said memory and said I/O devices during read and write operations, said method comprising the steps of:

a) caching said data being transferred between said memory and said I/O devices during read and write operations including data prefetched from said memory in anticipation of being transferred to said I/O devices during read operations in at least one cache data array having a plurality of cache lines, wherein each cache line has at least two cache line segments, each of said cache lines being mapped to a memory page;

b) describing data cached in said cache lines with a parent cache tag array having a plurality of parent cache tag entries corresponding to said cache lines, one parent cache tag entry per cache line, each of said parent cache tag entries describing common attributes of data cached in the cache line segments of the corresponding cache line;

c) describing data cached in said cache line segments further with at least one child cache tag array having a plurality of child cache tag entries corresponding to said cache line segments, one child cache tag entry per cache line segment, each of said child cache tag entry describing unique attributes of data cached in the corresponding cache line segment;

d) responding to read and write operations against said memory by said I/O devices using said at least one cache data array, and said parent and child cache tag arrays.

12. The method as set forth in claim 11, wherein, each of said parent cache tag entries comprises a memory page address identifying an allocated memory page to which the corresponding cache line is allocated, and an access mode indicator indicating whether the allocated memory page is being read or written into by an I/O device.

13. The method as set forth in claim 12, wherein, each of said parent cache tag entries further comprises a memory page size indicator.

14. The method as set forth in claim 12, wherein, each of said child cache tag entries comprises a memory block address identifying a memory block of the allocated memory page whose data are currently cached in the corresponding cache line segment, an offset indicator identifying a starting byte location in the corresponding cache line segment where data are cached, a byte count denoting the number of data bytes currently cached in the corresponding cache line segment, and a validity indicator identifying whether data currently cached in the corresponding cache line segment during read operations are valid and whether data currently cached in the corresponding cache line segment during write operations are dirty.

15. The method as set forth in claim 11, wherein, when a read operation against said memory by an I/O device results in a cache read hit, said response to the read operation in said step d) includes causing a new data block to be prefetched from said memory and stored into one of the cache line segments of the cache line yielding the cache read hit, the prefetched new data block having a predetermined relationship to the data being read by the I/O device.

16. The method as set forth in claim 15, wherein, the prefetched data block is sequential to the data being read by the I/O device, a first sequential data block to the data being read by the I/O device having been prefetched when a predecessor data block to the data being read by the I/O device was read by the I/O device.

17. The method as set forth in claim 11, wherein, when a read operation against said memory by an I/O device results in a cache read miss, said response to the read operation in said step d) includes causing a rerun and a blocking request to be issued to said I/O bus, the data being read by the I/O device and a predetermined number of new data blocks having a predetermined relationship to the data being read by the I/O device to be fetched and prefetched from said memory and stored into selected number of cache line segments of a selected cache line, and then an unblocking request to be issued to said I/O bus, said response to the read operation in said step d) further includes selectively causing mapping validation of said memory, allocation of one of said cache lines, and flushing the content of a cache line, depending on the content of said parent and child cache tag arrays, said allocation of one of said cache lines including conditional flushing/invalidating of the content of the cache line to be allocated depending on the content's state.

18. The method as set forth in claim 17, wherein, the predetermined number of new data blocks to be prefetched equals the number of cache line segments of the selected cache line minus one.

19. The method as set forth in claim 11, wherein, said response to a write operation in said step d) includes causing the data being written into said memory to be written into a cache line segment of a cache line yielding a cache write hit, and the corresponding child cache tag entry to be updated.

20. The method as set forth in claim 19, wherein, when a write operation against said memory by an I/O device results in a cache write miss, said response to the write operation in said step d) further includes selectively causing memory page writability validation, allocation of one of said cache lines, flushing/invalidating the content of a cache line, depending on the content of said parent and child cache tag arrays.

21. The streaming cache as set forth in claim 1, wherein, said I/O devices comprises an I/O device having a plurality of I/O ports, said I/O device having a plurality of I/O ports using said streaming cache to currently transfer a plurality of streams of I/O data between itself and said memory.

22. The method as set forth in claim 11, wherein, said I/O devices comprise an I/O device having a plurality of I/O ports, said step d) further comprises responding to a transfer of a plurality of streams of I/O data between said memory and said I/O device having a plurality of I/O ports.

* * * * *